(12) United States Patent
LeVander

(10) Patent No.: US 6,216,108 B1
(45) Date of Patent: Apr. 10, 2001

(54) SERVICE BUSINESS MANAGEMENT SYSTEM

(76) Inventor: Mark R. LeVander, 273 Thunder Lake Rd., Wilton, CT (US) 06897

( * ) Notice: Subject to any disclaimer, the term of this patent is extended or adjusted under 35 U.S.C. 154(b) by 0 days.

(21) Appl. No.: 08/909,341

(22) Filed: Aug. 11, 1997

(51) Int. Cl.[7] ............................................. G06F 17/60
(52) U.S. Cl. ........................ 705/7; 705/400; 705/500
(58) Field of Search .................................. 705/400, 500, 705/7

(56) References Cited

U.S. PATENT DOCUMENTS

| | | |
|---|---|---|
| 5,168,445 | 12/1992 | Kawashima et al. . |
| 5,249,120 | * 9/1993 | Foley . |
| 5,317,503 | * 5/1994 | Inoue . |
| 5,546,564 | * 8/1996 | Horie . |
| 5,570,291 | 10/1996 | Dudle et al. . |
| 5,615,342 | 3/1997 | Johnson . |
| 5,694,323 | * 12/1997 | Koropitzer et al. . |
| 5,793,632 | * 8/1998 | Fad et al. . |

FOREIGN PATENT DOCUMENTS

403735 * 12/1990 (EP) .

OTHER PUBLICATIONS

Harold Kerzner, Ph.D., Project Management: A Systems Approach to Planning, Scheduling and Controlling, 2nd Ed., Chapter 14, pp. 655–688, 1984.*
Jeffrey M. Kanter and Mathew P. Ward, Long–Term Incentivers for Management, Part 4: Performance Plans, Compensation and Benefits Review (1990).*
Martinez, T.A., "Calculating the Cost of Construction," Cost Engineering, vol. 36, No. 3, pp. 35–39, Mar. 1994.*
Kerridge, A.E., "Hard–Dollar Estimating (part 2)," Hydrocarbon Processing, vol. 71, No. 3, p. 141, Mar. 1992.*

* cited by examiner

Primary Examiner—Tariq B. Hafiz
Assistant Examiner—Jennifer Ione Harle
(74) Attorney, Agent, or Firm—St. Onge Steward Johnston & Reens LLC

(57) ABSTRACT

The invention provides a micro processor, an input device for entering job costing data and job parameter information, an output device such as a printer to generate contract proposals and/or management reports. A display device is preferably also provided to display the minimum labor rate calculated by a program executed on the microprocessor from the job costing data. Memory is preferably also provided to store at least the minimum labor rate for use in generating management reports.

22 Claims, 5 Drawing Sheets

PRIOR ART
MOBILE COMPUTER SYSTEM

SERVICE BUSINESS MANAGEMENT SYSTEM

FIELD OF THE INVENTION

The invention relates to a computer-based management system for a service contracting business which quickly and easily generates written contract proposals, invoices and reports on profitability. The invention also relates to a service business management system that is readily transportable, permitting business to be effectively conducted from virtually any location.

BACKGROUND OF THE INVENTION

Written contracts help protect both contractors and their clients by reducing misunderstandings, clarifying terms and setting mutually agreed upon prices.

Service contractors, such as those involved in any form of the many property maintenance, repair and building trades, are faced with certain problems. They can greatly benefit from the advantages of having written contracts with their clients, however, the nature of these businesses creates logistical problems. Most service contractors need to view a job site or property at a remote location in order to prepare a contract proposal. They also tend to work in the field or have employees who work in the field. In a typical day many contractors will work at a number of locations—at an office, in the field, from a vehicle, and at home. Thus organizing and managing a service business involves challenges often not associated with other businesses.

Computers are an effective tool to help organize information and manage a business. Most businesses use them; however, most service contracting businesses only realize a fraction of the potential benefit because of limited availability of software programs written specifically for them and the mismatch between common computer systems—desktop PCs or larger computers—and the mobile nature of their work.

Some of the conventional methods that service contracting people use to conduct business are:

giving verbal quotes and invoices;

submitting nothing other than a price written on a business card;

preparing hand written contract proposals and invoices; and viewing a job or completing work in the field, returning to the office to use a computer system to generate a contract proposal, change order, or invoice, and then mailing, faxing or delivering the documents to the client.

Some of the drawbacks of these common practices are as follows: verbal contracts or prices written on business cards result in no documentation or historical records. If there are any problems or misunderstandings, the contracts may be unenforceable. Hand written paper work is often poorly organized and difficult to read. Any changes to original copies are cumbersome at best. When any of these methods are used, job estimates are often largely guess work, or based on rule of thumb generalizations that may or may not be based on sound management and accounting practices. In order to be successful, businesses using these methods often use only seasoned individuals with years of work experience for bidding.

Better organized service businesses often have a computer system in a central office. Some of the disadvantages with this arrangement are the time delays that occur due to the distance between work sites and the office, and the lack of access to important information while in the field or away from the office for any reason. For example, it typically takes several days to a week for a mailed contract proposal to reach a client after the initial visit to review work to be done. Furthermore, most service businesses use a word processor or spreadsheet computer program to generate contract proposals and invoices. These are very inefficient systems in this context because critical information is either not captured at all, or stored in many separate files making it difficult to extract and utilize it in a meaningful way.

Conventional methods for conducting business away from an office include using standard brief cases and perhaps file boxes to transport written documents or records. More recently business people have employed a laptop or notebook computer, a carrying case and possibly even some related organizers or gadgets for their vehicles.

U.S. Pat. No. 5,570,291 is a system for quickly estimating and ordering the custom manufacture of an item wherein a remote computer with general customer and delivery data, is linked to a central computer with a database of product details for creating price estimates, which in turn is linked to a third computer at a manufacturing plant for accessing scheduling and delivery data as well as immediate order placement. This system is geared towards the manufacture of a product.

U.S. Pat. No. 5,317,503 is an apparatus designed for calculating the repair cost of a damaged car. It is specifically designed for insurance applications.

Tree Management Systems, Inc. of Bloomington, Indiana, provides a tree service industry system for both a hand held computing device and standard desktop computers. The desktop system allows the operator to organize client and job information, generate invoices and itemized proposals, schedule work, track employee and inventory data, and generate reports for receivables, jobs and sales. The portable hand held system is limited only to maintaining customer information and generating proposals.

Contractor's Management Systems of Langdon, N.H., provides a system for the plumbing, HVAC and electrical industries that includes general ledger, financial statements, check writing, point of sale processing, bar coding, inventory tracking, and service scheduling as well as estimating and establishing set prices for common tasks. The system apparently requires an operator to factor in an overhead margin and a profit margin on top of labor costs and materials costs to determine prices for specific tasks to be included in a "price book". Reference is also made to generating estimates by creating and combining several assemblies of parts. Thus, it appears that this system is geared towards setting standard prices that will repeatedly be charged for specific tasks such as changing a hot water heater or installing a bath tub. There is also reference to comparing actual hours and materials to "defined" hours and materials in order to examine a task for profitability. It appears that this is an attempt to check that the average amount of actual time and materials used in a specific task over time is commensurate with the time and materials allocated when the price for that task was set. There is a reference to a portable system, but the capabilities are apparently limited to generating proposals and invoices.

The Roofer's Database of Garland, Tex., provides a software program for the roofing industry that organizes customer and job information, generates proposals and invoices, tracks employees, suppliers, sales leads and sales performance. Reference is made to "job costing" for job estimates where the operator inputs "profit and overhead percentages" in addition to labor and materials. It also refers to measuring productivity by tracking the history of "squares" (of direct material) bid versus "squares" (of direct materials) used.

Evergreen Technology of Seattle, Wash., provides a system specifically for the painting and wall covering industry that includes labor rate calculation, bidding, invoicing, work scheduling and employee motivation. In the labor rate calculation, overhead is based on monthly expenses. Depreciation for equipment or other capitalized expenses doesn't appear to be accounted for. Profit is a flat percentage markup on an operator's "desired profit", and there are no guidelines for establishing what an appropriate profit percentage should be. Time and materials are used to generate itemized prices in an estimate worksheet, but actual proposals don't have itemized prices or a job discount, and an operator doesn't have the ability to use discretion to override a price that the system calculates. There are job cost reports that compare actual to estimated labor, materials, overhead and profit for a job.

What is desired, therefore, is a computer-based system specifically designed to help service contracting people in a variety of industries quickly and easily generate written contract proposals with itemized prices that are competitive yet profitable. Furthermore, the operator should be able to use discretion as needed to override any particular price that the system calculates or to offer a job discount as desired to reflect the efficiencies that a contractor can realize when executing larger jobs or multiple jobs in a single location, and to encourage clients to accept more services. Since the most significant cost driver in many service businesses is labor, the emphasis for pricing, profitability and any comparisons is summarized by consistently referring to labor rates that, after being adjusted for direct materials expenses, specifically incorporate all other business expenses and a justifiable profit.

The benchmark or minimum labor rate is calculated using generally accepted job cost accounting methods that properly incorporate depreciation expenses and profit. Profit, as forecasted in a proposal price, should conform to the common job cost accounting concepts of return on investment or return on equity compared to alternative potential investments. Thus, an estimated profit can justifiably be set by comparing an expected rate of return to returns of Treasury Bills and the stock market as is common in economic theory, instead of randomly choosing a "profit markup" on any particular job.

The system also organizes information so that it is easily accessible and can provide meaningful performance feedback including survey responses from clients so that managers can make informed decisions about how to improve the business. The system generates work orders, invoices and profit reports based on only the accepted portions of an itemized proposal.

A system with all of the above capabilities would further benefit service contracting people if the whole system was completely portable.

SUMMARY OF THE INVENTION

Accordingly, it is an object of this invention to provide a computer-based service business management system that organizes and stores important information and allows it to be quickly and easily accessed and utilized.

It is another object of this invention to provide a system that quickly and easily generates written contract proposals and invoices.

It is another object of this invention to provide a system that will quickly and easily calculate and display a minimum labor rate charge that will cover estimates of business costs and allow for a profit.

It is another object of this invention to provide a system that will calculate and display estimates of competitive yet profitable prices for a contract proposal by incorporating a user's estimates of time and materials to complete the job, and will automatically apply a calculated minimum labor rate charge.

It is another object of this invention to provide a system that will calculate and display estimates of competitive yet profitable prices for a contract proposal by incorporating a user's measurements of an area to be worked on, and automatically applying historical average usage rates or industry standardized usage rates for direct labor time and direct materials used per unit of area, and then automatically apply a calculated minimum labor rate charge.

It is another object of this invention to provide a system that quickly and easily generates written contract proposals with itemized prices.

It is another object of this invention to provide a system that will calculate and display an estimate of a maximum job discount that can be offered based on the difference between a sum of itemized prices included within the contract proposal and a calculated minimum job price based upon a minimum labor rate charge.

It is another object of this invention to provide a system that will calculate and display an estimate of a maximum job discount that can be offered based on the difference between a sum of itemized prices included within the contract proposal and a calculated minimum job price that incorporates estimates of time and materials to complete the job, based on a users measurement of area to be worked on, and automatically applies a calculated minimum labor rate charge.

It is another object of this invention to provide a system that quickly and easily generates written contract proposals with itemized prices and a job discount that is offered if a contract is accepted in full.

It is another object of this invention to provide a system that quickly and easily generates work orders and invoices based on accepted contracts or only the accepted portions of itemized contract proposals.

It is another object of this invention to provide a system that helps manage a business by generating reports that calculate estimates of job profit and compare bidding estimates to actual results based on labor rates. These reports can be used to track the effectiveness of managers, sales people and employees, as well as general business performance. These reports also provide regular feedback so that informed adjustments and improvements can be made in performance.

It is another object of this invention to provide a system that organizes client lists and utilizes client feedback to quickly and easily generate lists of references for presentation to potential new clients.

It is another object of this invention to provide a system that can quickly and easily summarize outstanding receivables.

These and other objects of the invention are achieved by provision of a micro processor, an input device for entering job costing data and job parameter information, an output device such as a printer to generate contract proposals and/or management reports.

A display device is preferably also provided to display the minimum labor rate calculated by a program executed on the microprocessor from the job costing data. Memory is preferably also provided to store at least the minimum labor rate for use in generating management reports.

In one embodiment, the program calculates minimum job price which is displayed, prompting entry of a contract price. In another embodiment, the program calculates a maximum job discount which is displayed, prompting entry of a labor rate and determination of a price.

Management reports generated by the system include comparison of minimum to actual labor rate and actual to contract labor rate. Survey results may be reviewed on a crew by crew basis, and references may be retrieved on a customer basis.

Additionally, it is an object of this invention to provide a complete computer-based service business management system and materials commonly used by service contracting people to conduct business in an arrangement that can be readily transported, and quickly and easily utilized from virtually any location. This combination of materials and information that can be transported in a usable arrangement is considered to be more than a mobile office and might therefore be referred to as a "mobile business management system".

This additional object and other objects of the invention are achieved by provision of the previously listed items for the computer-based service business management system as well as:

a carrying case power supply components such as batteries, battery chargers, power cords, a power converter, power adapters, or a power surge protector other materials and equipment commonly used by service contracting people to conduct business such as pens, pencils, calculators, reference materials, marketing materials, a stapler, paper clips, binders or business cards.

The principal information processor for the mobile business management system may be integral to the mobile system, as would be the case if a common portable computer is used by itself, or it may be located apart from the mobile system, as would be the case if a central computer is remotely accessed by the mobile system. Remote access might be accomplished by telecommunications or wireless communications.

As used to describe the invention, "service contracting people" and "service contractors" include, but are not limited to, service contracting business owners, managers, sales people, forepersons, trades people, their employees and subcontractors.

Also as used to describe the invention, "service contracting businesses" and "service contractors" include, but are not limited to, businesses related to:

| | |
|---|---|
| awnings/canopies | building/remodeling |
| carpentry | carpet installation/cleaning |
| chimney cleaning | closet remodeling/closet organizers |
| decorating | drywall/sheetrocking |
| electrical services | excavating |
| fencing | fire/burglar alarms |
| flooring | furniture restoration |
| glass repair/replacement | handyman services |
| home health care | house/office cleaning |
| HVAC | insulation |
| interior plantscapes | irrigation systems |
| kitchen remodeling | landscaping |
| locksmith | masonry |
| moving | painting |
| paving | pet restraining systems |
| plumbing | pressure washing |
| roofing/siding | sandblasting |
| tiling | tree service |
| upholstering | water/damage restoration |
| waterproofing | welding |
| window cleaning | window replacements |
| window treatments | |

Without limitation, some examples of service contracting people using a mobile business management system are:

a sales person presenting an on site contract proposal directly to the client during the initial visit to review work to be done, resulting in a signed contract on the spot;

a job foreperson creating a change order sheet in the field to be immediately signed by the client, providing the necessary documentation that will help minimize misunderstandings;

a repair person creating an invoice for on site work just completed and presenting it directly to the client, resulting in reduced office work, reduced time delays and improved cash flow for the business; and a manager generating and printing reports at home in the evening.

DETAILED DESCRIPTION OF THE INVENTION

Figure 1:
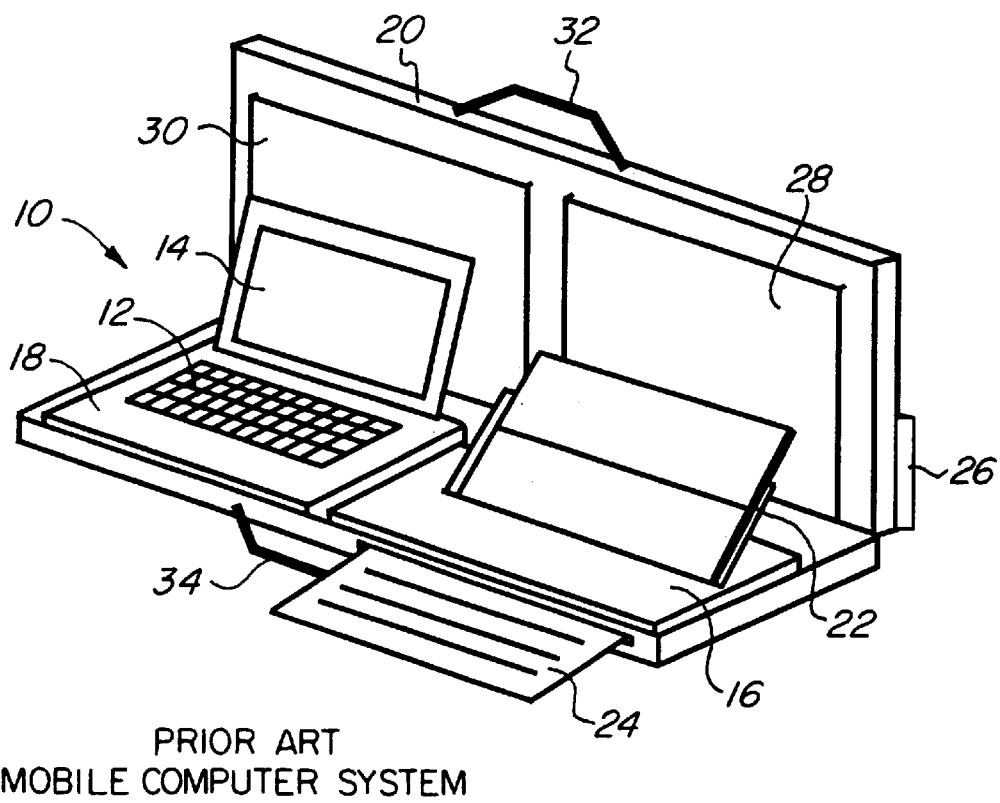
FIG. 1 is a diagram depicting an embodiment of the service business management system of the present invention as a mobile system including a carrying case for transport.

FIG. 1 is a diagram representing a mobile service business management system in accordance with the invention. The service business management system 10 includes an input device such as a keyboard 12 or a voice recognition system, display device such as a monitor 14, and an output device such as a printer 16. FIG. 1 depicts the system 10 in a mobile embodiment as a portable computer 18 in a carrying case 20 that can transport the system components in an arrangement such that they can quickly and easily be utilized from within the case 20 when the case 20 is in an open position with minimal connecting or repositioning. In FIG. 1, the printer 16 is shown engaged in a printing process, with a paper feeder 22 feeding paper, and a printed sheet of paper 24 exiting the printer 16. Power supplies for the computer 18 and the printer 16 can be rechargeable batteries that are integral to either unit, connection to an available AC outlet or plugging into a vehicle cigarette lighter via a DC to AC power converter. A separate pouch or gusset 26 as part of the case 20 can contain power cords, adapters, power converters or power surge protectors as needed. Holders 28 and 30 can organize paper, letterhead, pens, pencils, a calculator, a stapler and the like. Thus, the mobile system 10 in FIG. 1 can be transported by carrying handles 32 and 34 to any number of locations such as job sites, vehicles, an operator's home or office and then quickly and easily utilized to conduct business.

It is to be understood that FIG. 1 depicts a mobile embodiment of the invention and that the service business management system 10 in other embodiments may include, but are not limited to, a standard desktop PC and office printer, a LAN or other installation of multiple interconnected computers, hand held or pen computers, or network computers and the like.

Figure 2:
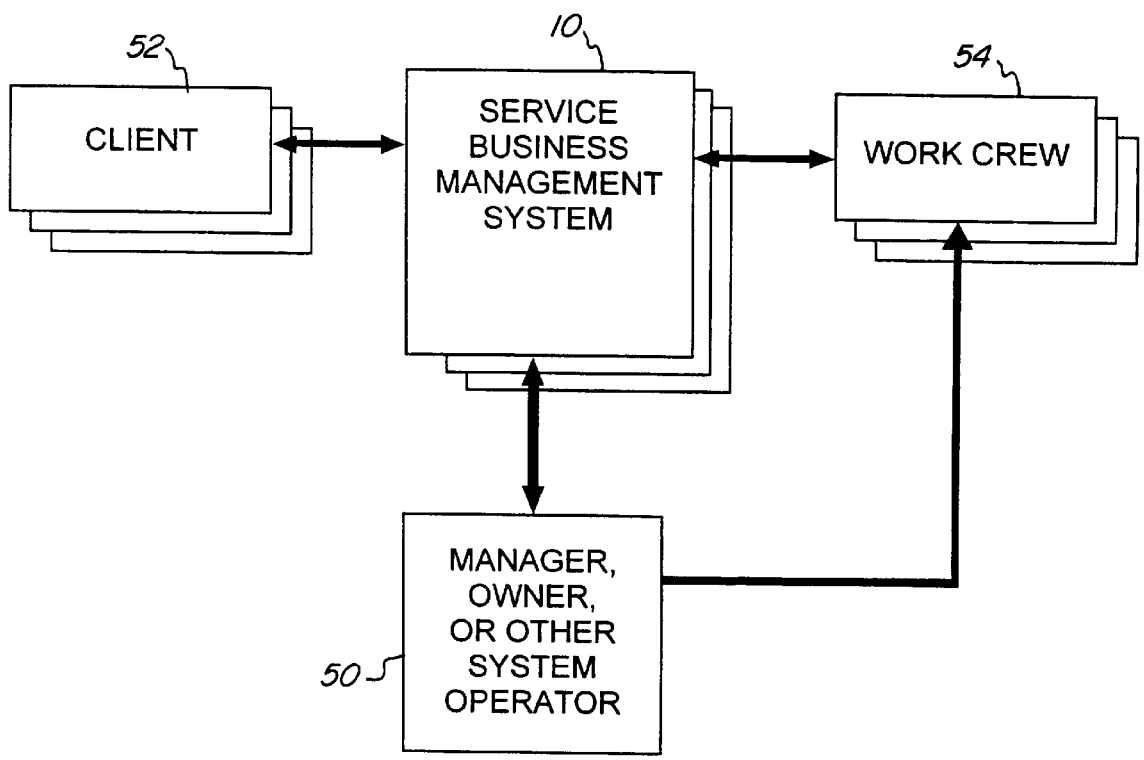
FIG. 2 is a block diagram generally depicting the flow of information to and from the service business management system of FIG. 1.

FIG. 2 is a block diagram generally depicting information flows relating to the service business management system 10. A particular service business might use a single system 10, or a plurality of systems as represented in FIG. 2. An owner or manager 50 would typically be a system operator as well as other managers, sales people or forepersons. Operators 50 utilize the system 10 to gather, store and present information to and from a plurality of clients 52 and a plurality of work crews 54. The system 10 helps to organize the business and provide feedback that can be used to improve service quality and profitability.

Figure 3:
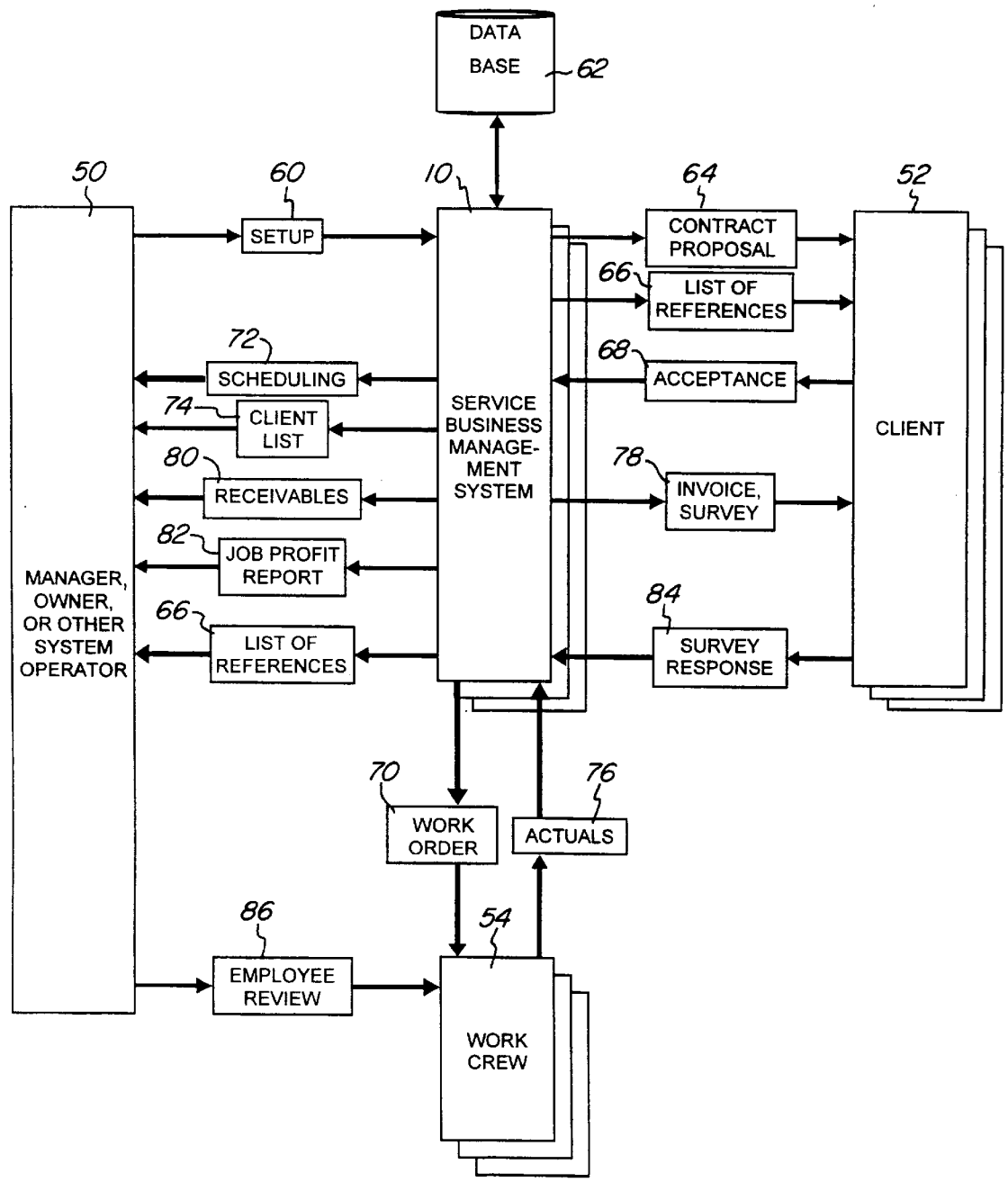
FIG. 3 is a block diagram detailing the flow of information in FIG. 2.

FIG. 3 is a block diagram detailing the interactions in FIG. 2. It is understood that as represented in the diagram the system 10 may be a single system operated by a single person or a number of people, or a number of systems operated by a number of people, and that the business may employ one or a number of work crews 54 to provide services for one or a number of clients 52. The following discussion refers to a typical example of a preferred embodiment of the invention.

Figure 4:
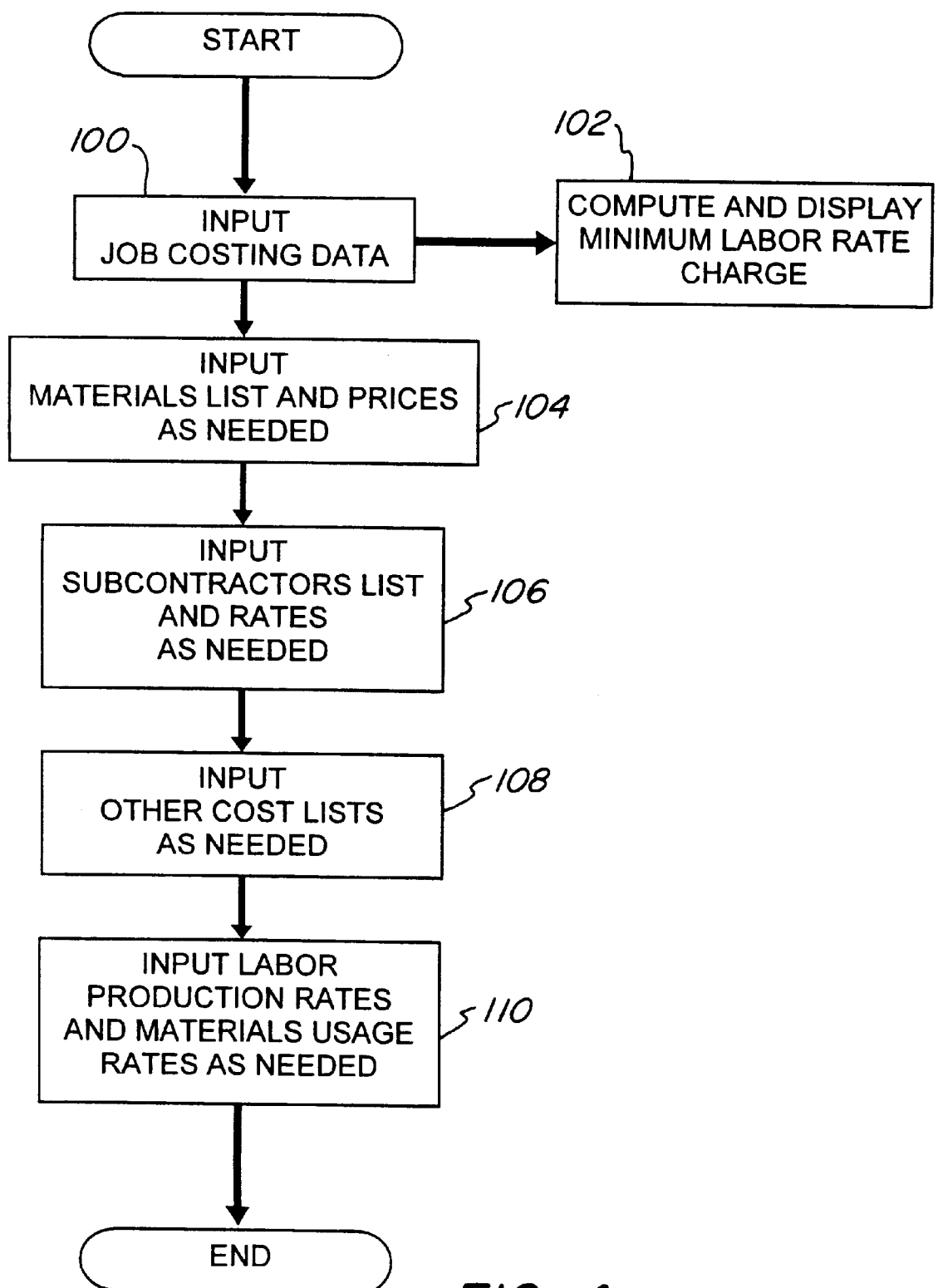
FIG. 4 is a flow diagram detailing the setup block in FIG. 3.

In FIG. 3, a manager 50 sets up the system 10 at block 60 by inputting information that will be used when generating contract proposals 64 and other reports. FIG. 4 details the setup block 60. In FIG. 4, the system operator 50 inputs job costing data at block 100 that the system 10 utilizes to calculate a minimum labor rate charge at block 102. An example of job costing data input at block 100 would be:

an average of direct labor wages for employees on work crews (AW)

annual direct labor hours (DLH)

the workman's compensation insurance rate for the business expressed as a percentage of wages(WCIR)

estimated annual overhead expenses for the business (OE)

equity investment in the business (EI)

expected return on equity investment expressed as an annualized percentage rate of return (ROE)

An example of the calculation performed by the system 10 to determine the minimum labor rate (MLR) at block 102 would be:

$$MLR = AW + (AW * WCIR) + \frac{OE}{DLH} + \frac{(EI * ROE)}{DLH}$$

Overhead expenses should include appropriate depreciation expenses for equipment and other business expenses that are capitalized. In this example, profit is expressed as the equity investment in the business multiplied by the expected return on equity investment. Equity investment is commonly defined in accounting references as total business assets including working capital, minus outstanding debt including capitalized leases. Expected return on equity investment for a particular service business can be related to the long term return on the publicly traded stock of companies in the same industry or similar industries. Upward adjustments are typically made in the expected rate of return to allow for a controlling ownership interest or a small business that is inherently more risky than a larger publicly traded company. Thus, it is not unusual for a small business owner to expect an annual return on the equity investment in the range of twenty to thirty percent.

The minimum labor rate, as calculated above, is displayed by the system 10 for use by managers, sales people and other employees. Because several of the numbers used are forecasted estimates for the current or coming time period, deriving these numbers can prompt managers and other employees to focus on general business issues and goals. Furthermore, as time progresses or the business changes, managers and employees can review previous estimates and come up with new estimates based on new or updated information. Again, this can prompt discussion of important issues.

At block 104, the operator 50 inputs a list of the materials and their unit prices commonly used by the work crews to provide services to clients. These will typically be direct materials that are considered part of a specific job, such as paint products for a painting contractor or fabric for a window treatment business.

At block 106, the system operator 50 inputs a list of any commonly used subcontractors and their known charges or rates. For example, a driveway paving contractor may often use a particular excavating company when a large piece of excavating equipment is needed for a job. The system operator 50 may input the name and phone number of the excavator, the model of the machine, the hourly or daily rate for the machine and an operator, and any transport fee to have the machine delivered and removed from the job.

At block 108, the operator 50 inputs any other common direct costs associated with the business. For example, a kitchen remodeling contractor might include a town permit fee and the charge rate, such as $10 for every $1,000 of estimated job cost.

At block 110, the operator 50 inputs, as needed or desired, historical or industry standards for labor production rates and materials usage rates per unit of work area. In some service industries, these rates are measurable and consistent enough that a measurement of an area to be worked on, such as the square footage of a new black top driveway, can be used to calculate estimates for direct labor time and direct materials.

Referring back to FIG. 3, the system 10 stores the setup information from block 60, as well as all other information inputted into the system in database 62 for use and recall as required. It is understood that as represented in FIG. 3, the database 62 may be located in the same place as the rest of the system 10—as would be the case in embodiments of the invention including a self contained portable computer or a single desktop PC—or the database 62 may be located separately from a system 10—as would be the case if a mobile system 10 or several mobile systems are used by sales people in the field and a central computer is remotely accessed by the mobile systems via telecommunications or wireless communications. Similarly, a network computer that has limited processing or storage capabilities may be used together with a portable printer as a mobile system 10 and the internet may be utilized to access an internet site that is in effect the database 62, or may be connected to the database 62.

Figure 5:
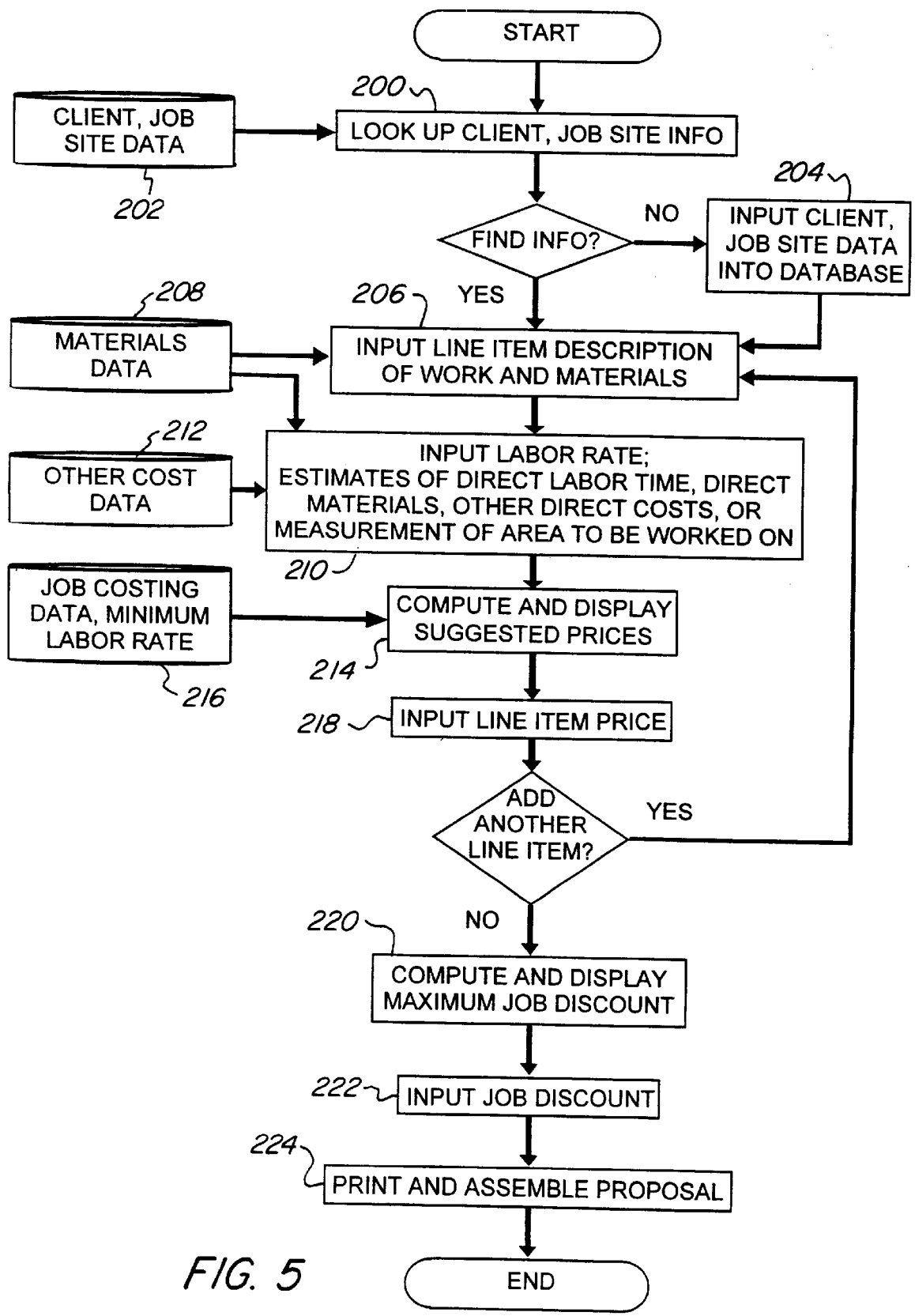
FIG. 5 is a flow diagram detailing the contract proposal block in FIG. 3.

Now that the system 10 has been set up at block 60, it is ready to start generating printed contract proposals at block 64. FIG. 5 is a flow diagram detailing the contract proposal block 64. In FIG. 5, a system operator 50 first looks up the client/job site at block 200 by searching the client/job site database 202, which is a part of the system database 62. If the client/job site data is found, the operator 50 proceeds to block 206. If the client/job site data is not found, the operator 50 creates a new account at block 204 by inputting the appropriate information. Once the client/job site account is either located or created, the operator 50 can start creating the contract proposal. At block 206, the operator 50 inputs a work description for one line item or work item of the proposal. If needed, the operator 50 can incorporate any of the materials inputted during the setup procedure 60 by viewing the materials database 208 which is a part of the system database 62 shown in FIG. 3. The operator 50 includes any materials in the work description by viewing the materials list and selecting any appropriate records. If a material is not found in the materials list, the operator 50 can easily add it to the database 208 in FIG. 5.

Once the line item work description at block 206 is completed, the operator 50 inputs at block 210 either estimates of time and materials needed to complete the work or a measurement of the work area as described in block 206. Specifically, the operator 50 either inputs estimates of direct labor time and direct materials amounts, or a measurement of the work area to which the system 10 applies the labor production rates and materials usage rates input at block 110 in FIG. 4 in order to calculate the estimates of direct labor time and direct materials amounts needed to complete the work description. To include direct materials or other direct costs, the operator 50 or the system 10 can access the materials database 208 and the other cost database 212 in FIG. 5, which are part of the system database 62 as inputted in the system setup at block 60 in FIG. 3. The operator 50 also inputs at block 210 in FIG. 5 a labor rate that can vary depending on the type and difficulty of work, the crew that will most likely be doing the work, and other considerations. The labor rate inputted for any single line item will typically be greater than the minimum labor rate calculated by the system 10 at block 102 in FIG. 4. This is done to allow for general operating inefficiencies that are common when contractors execute relatively small jobs, compared to general operating efficiencies that are common when contractors execute relatively large jobs.

The system computes and displays two prices at block 214 of FIG. 5 for the work item described in block 206. One price is a minimum line item price that is calculated by multiplying the direct labor time estimate from block 210 by the minimum labor rate calculated from the data in the job costing database 216 which was inputted at block 100 in FIG. 4, and then adding the costs for the direct materials and other direct from block 210 in FIG. 5.

The second price displayed for the work line item is calculated by using the same time and materials estimates from block 210, then multiplying the direct labor time estimate by the labor rate inputted at block 210.

At block 218, the operator 50 considers both prices calculated and displayed by the system 10 at block 214, and then inputs a price for the contract proposal work line item that is preferably at or near the higher price related to the higher labor rate inputted at block 210.

As shown in FIG. 5, the line item description, costing and pricing procedures are repeated for each additional work line item to be included in the contract proposal until all line items are completed.

At block 220, the system 10 calculates and displays a maximum job discount that can be offered to the client if the whole contract proposal including all line items entered at block 206 is accepted. Specifically, the system 10 calculates the maximum job discount by summing the itemized proposal prices inputted at block 218, then subtracting a sum of the minimum line item prices calculated at block 214 which are based on the minimum labor rate calculated from the job costing data stored at database 216. Thus, the maximum job discount summarizes the difference between the minimum labor rate and higher labor rates incorporated in the proposal line item prices.

At block 222, the operator 50 considers the maximum job discount displayed at block 220, and then uses discretion to input an actual job discount for the contract proposal, if any. Typically, to come up with an actual job discount, the operator 50 also considers such things as the type of work, the desirability of working for the client, the size of the job, and the potential efficiencies of doing the whole job. By including line item prices and a job discount for the contract proposal, a sales person can propose additional work without increasing the possibility of no acceptances, while the discount encourages a client to sign up for the whole job.

Finally, at block 224 the operator 50 has completed all the inputs the system 10 needs to generate the printed proposal. Referring again to FIG. 3, the system 10 prints the contract proposal 64 to be reviewed by the client 52. An operator 50 can also use the system 10 to generate a list of references 66 for the client 52. Specifics regarding the generation of the list of references 66 will be detailed later in the discussion of FIG. 3.

If the client 52 wants to proceed with any of the work, an acceptance 68 is indicated, typically a copy of the proposal with accepted line items initialed and the clients signature indicating acceptance of the initialed work descriptions as well as other terms and conditions included in the contract. Upon receiving the acceptance 68, the operator 50 inputs markers into the system 10 to identify accepted line items of the contract proposal 64. The operator 50 then uses the system 10 to print out a work order 70 for the work crew 54, and the job can be included in the scheduling function 72 as the manager 50 coordinates work to be done by the work crews 54. Also, upon acceptance 68, the client 52 can now be included in the client list 74 which is generated by the system 10 and includes all patrons for whom work has been performed or is scheduled to be performed by the business.

The work order 70 includes information related to the accepted work items from block 68 presented in a way that helps the work crews 54 execute the job in a concise, efficient and organized manner. Typically, the first page of the work order 70 includes a job summary that includes client and job site information, job price, the sales person who bid the job, the date of the bid, and summaries of estimates from block 210 in FIG. 5 of time, materials and other costs for all accepted line items. Thus, the manager 50 can quickly and easily assess the scope of the job no matter which employee actually bid the job or when it was bid. Furthermore, the work crew 54 will have a concise shopping list of materials and other items that will likely be needed to start and complete the job.

The remainder of the work order 70 includes a break down of information for each line item accepted at block 68. Specifically, for each accepted line item, the work order 70 would include the work description and direct materials input at block 206 in FIG. 5, the line item price input an block 218, and the estimates of direct labor time, direct materials amounts and other direct costs and specifications which were input or calculated at block 210. If there was a job discount (JD) input at block 222 and the whole job was accepted, then the price for each line item on the work order 70 is adjusted to reflect the job discount as follows: the line item or work item price (WIP) at block 218 of FIG. 5; minus a price adjustment (PA), which is calculated as:

$$PA = JD * \left( \frac{WIP}{(\sum (WIP \text{ excluding } JD))} \right)$$

Thus, the work crew 54 in FIG. 3 has complete written specifications to autonomously perform work as accepted by the client 52, allowing managers and sales people the freedom to concentrate on other activities to further the business rather than spending significant amounts of time supervising work crews.

The work order 70 is also preferably designed to be a job worksheet. As the work crew 54 is executing work items, they are instructed to record the names of employees performing each work item as well as the actuals 76 for time, materials and other direct costs used to complete each work item. This process helps work crew members focus on the estimated time and materials from block 210 in FIG. 5 as their specific goals for executing each line item as described at block 206. As the work crew 54 is completing work items and filling in the actuals 76, they are also getting immediate feedback on their work performance by comparing the actuals 76 to the estimates detailed in the work order 70.

When the job is completed, the operator 50 inputs the actuals 76 for each work item as well as the date the job was completed into the system 10. Now the system 10 can be used to generate an invoice 78 and preferably a survey to be presented to the client 52. Typically, the survey requests the client 52 to rate general satisfaction with the work done, specify anything that was particularly liked or disliked, and give permission to use their name and phone number as a reference.

When the job is completed, any corresponding balance due from the client 52 can be included in a receivables report 80 generated by the system 10 which tallies all outstanding receivables at any given time for the manager 50.

The operator 50 can also use the system 10 to generate a job profit report 82 for the manager 50 and possibly other employees. The job profit report 82 includes a job summary for reviewing the whole job, and details for each of the completed work items. The job summary preferably identifies the client and job site, the sales person, the bid date, the date completed, and includes an estimate of actual profit for the whole job, the estimated actual job profit as a percentage of the job price, comparisons of the actual labor rate for the whole job to the minimum labor rate calculated in block 102 in FIG. 4 and the labor rate at which the job was bid, and comparisons of estimates from block 210 in FIG. 5 to the actuals at block 76 in FIG. 3.

The estimate of actual profit for the whole job (AJP) is calculated by the system 10 as follows: for all accepted work items at block 68 of FIG. 3—the sum of the work item prices (WIP) at block 218 of FIG. 5; minus any job discount (JD) at block 222 of FIG. 5; minus a sum of the actuals at block 76 of FIG. 3 for direct materials costs and other direct costs (ADMC); minus actuals at block 76 of FIG. 3 for the sum of direct labor times multiplied by average direct labor wages at block 100 of FIG. 4 (ADLC); minus actuals at block 76 of FIG. 3 for the sum of direct labor times multiplied by average direct labor wages and the workman's compensation insurance rate at block 100 of FIG. 4 (AWCI); minus actuals at block 76 of FIG. 3 for the sum of direct labor times multiplied by annual overhead expenses at block 100 of FIG. 4 and then divided by annual direct labor time at block 100 of FIG. 4 (AOE):

$$AJP = \Sigma WIP - JD - \Sigma ADMC - ADLC - AWCI - AOE$$

The estimated actual job profit as a percentage of job price (AJP %) is calculated by the system 10 as the estimated actual profit for the whole job (AJP) as described above divided by: the sum of the work item prices (WIP) at block 218 of FIG. 5 for all accepted work items at block 68 of FIG. 3, minus any job discount (JD) at block 222 of FIG. 5:

$$AJP\% = \frac{AJP}{(\Sigma WIP - JD)}$$

The actual labor rate for the whole job (AJLR) is calculated by the system 10 as follows: for all accepted work items at block 68 of FIG. 3—the sum of the work item prices (WIP) at block 218 of FIG. 5; minus any job discount (JD) at block 222 of FIG. 5; minus a sum of the actuals at block 76 of FIG. 3 for direct materials costs and other direct costs (ADMC); divided by a sum of the actuals at block 76 of FIG. 3 for direct labor time (ADLT):

$$AJLR = \frac{(\Sigma WIP - JD - \Sigma ADMC)}{\Sigma ADLT}$$

The labor rate at which the job was bid (BJLR) is calculated by the system 10 as follows: for all accepted work items at block 68 of FIG. 3—the sum of the work item prices (WIP) at block 218 of FIG. 5; minus any job discount (JD) at block 222 of FIG. 5; minus a sum of the estimates at block 210 of FIG. 5 for direct materials costs and other direct costs (EDMC); divided by the sum of the estimates at block 210 of FIG. 5 for direct labor time (EDLT):

$$BJLR = \frac{(\Sigma WIP - JD - \Sigma EDMC)}{\Sigma EDLT}$$

For each of the completed work items, the job profit report 82 in FIG. 3 preferably includes an estimate of actual profit, the estimated actual profit as a percentage of the work item price, comparisons of the actual labor rate to the labor rate at which the work item was bid, and comparisons of estimates at block 210 of FIG. 5 to the actuals at block 76 of FIG. 3 for the work item.

The estimate of actual profit for the work item (WIAP) is calculated by the system 10 as follows: for the work item—the price (WIP) at block 218 of FIG. 5; minus a price adjustment (PA) if there was a job discount (JD) input at block 222 and the whole job was accepted, as follows:

$$PA = JD * \left(\frac{WIP}{(\Sigma(WIP \text{ excluding } JD))}\right);$$

minus actuals at block 76 of FIG. 3 for direct materials costs and other direct costs (ADMC); minus actuals at block 76 of FIG. 3 for direct labor time multiplied by average direct labor wages at block 100 of FIG. 4 (ADLC); minus actuals at block 76 of FIG. 3 for direct labor time multiplied by average direct labor wages and the workman's compensation insurance rate at block 100 of FIG. 4 (AWCI); minus actuals at block 76 of FIG. 3 for direct labor time multiplied by annual overhead expenses at block 100 of FIG. 4 and then divided by annual direct labor time at block 100 of FIG. 4 (AOE):

$$WIAP = WIP - PA - ADMC - ADLC - AWCI - AOE$$

The estimated actual profit for the work item as a percentage of the work item price (WIAP %) is calculated by the system 10 as the estimate of actual profit for the work item (WIAP) as described above divided by the work item price (WIP) at block 218 of FIG. 5, minus a price adjustment (PA) if there was a job discount input at block 222 (JD) and the whole job was accepted:

$$PA = JD * \left(\frac{WIP}{(\Sigma(WIP \text{ excluding } JD))}\right)$$

$$WIAP\% = \frac{WIAP}{(WIP - PA)}$$

The actual labor rate for the work item (WIALR) is calculated by the system 10 as follows: for the work item— the price (WIP) at block 218 of FIG. 5; minus a price adjustment (PA) if there was a job discount input at block 222 (JD) and the whole job was accepted:

$$PA = JD * \left( \frac{WIP}{(\Sigma(WIP \text{ excluding } JD))} \right);$$

minus actuals at block 76 of FIG. 3 for direct materials costs and other direct costs (ADMC); divided by actuals at block 76 of FIG. 3 for direct labor time (ADLT):

$$WIALR = \frac{(WIP - PA - ADMC)}{ADLT}$$

The labor rate at which the work item was bid (WIBLR) is calculated by the system 10 as follows: for the work item—the price (WIP) at block 218 of FIG. 5; minus a price adjustment (PA) if there was a job discount input at block 222 (JD) and the whole job was accepted:

$$PA = JD * \left( \frac{WIP}{(\Sigma (WIP \text{ excluding } JD))} \right);$$

minus estimates at block 210 of FIG. 5 for direct materials costs and other direct costs (EDMC); divided by the estimate at block 210 of FIG. 5 for direct labor time (EDLT):

$$WIBLR = \frac{(WIP - PA - EDMC)}{EDLT}$$

The job profit report 82 in FIG. 3 can be used by the manager 50 for summarized feedback on business and employee performance compared to budget forecasts and goals. As jobs are completed, job profit reports 82 provide continual feedback, allowing the manger 50 to quickly identify both problems and successes, communicate any issues to employees and initiate changes that will improve service quality and profitability. Thus, the system 10 facilitates the communication loop or information cycle—set performance standards and goals, execute work, measure performance, compare performance to goals, improve performance—that is common in management theory and is often utilized in large well organized businesses. The system 10 allows smaller contracting businesses to easily employ these practices giving them the opportunity for continuous improvement and growth.

Additional feedback is realized when a survey response 84 is returned by the client 52 and the operator 50 inputs the data into the system 10. The system 10 can then identify clients 52 that are satisfied with the work and have given permission to use them as references to generate a list of references 66. The system 10 can also sort the list of references 66 by locality, such as zip code. Thus, when a contract proposal 64 is generated by the system 10, an appropriate list of local references 66 can also be presented to the client 52 which can help increase the chances of initiating an acceptance 68.

Survey responses 84 together with job profit reports 82 provide the manager 50 with a wealth of information with which to make informed management decisions and employee reviews 86. For employee reviews 86, the manager 50 can provide concise measurements of performance with specific details of successes and shortcomings.

What is claimed is:

1. A service business management system comprising:
   a microprocessor;
   an input device for entering job costing data, job parameter information, and a proposal price to said microprocessor;
   a program executing on said microprocessor which calculates a minimum labor rate from the job costing data, and calculates a minimum job price from the minimum labor rate and the job parameter information;
   a display device for displaying the minimum job price;
   an output device for generating a contract proposal having a proposal price entered after review of the displayed minimum job price; and
   wherein the minimum labor rate calculation includes as factors, the equity investment in the business (EI) and a desired rate of return on the equity investment (ROE).

2. The system of claim 1 wherein the minimum labor rate calculation also includes the parameters:
   average direct labor wages (AW), annual direct labor hours (DLH), workmen's compensation insurance rate (WCIR) and estimated overhead expenses (OE).

3. The system of claim 2 wherein the minimum labor rate (MLR) is calculated according to the formula:

$$MLR = AW + (AW * WCIR) + \frac{OE}{DLH} + \frac{(EI * ROE)}{DLH}.$$

4. The system of claim 1 in which the job parameter information comprises material costs and hours of labor.

5. The system of claim 1 in which the job parameter information comprises measurements of the job site.

6. The system of claim 5 in which the minimum job price is calculated from the job site measurements and an industry standard cost per unit measurement.

7. The system of claim 5 in which the minimum job price is calculated from the job site measurements and industry standard materials usage per unit measurement.

8. The system of claim 5 in which the minimum job price is calculated from the job site measurements and industry standard labor time per unit measurement.

9. A service business management system comprising:
   a microprocessor;
   an input device for entering job costing data, job parameter information, and a labor rate to said microprocessor;
   a program executing on said microprocessor which calculates a minimum labor rate from the job costing data, calculates a proposal price from the labor rate and job parameter information, calculates a minimum job price from the minimum labor rate and job parameter information, and calculates a maximum job discount by subtracting the minimum job price from the proposal price;
   a display device for displaying the minimum labor rate and maximum job discount;
   an output device for generating a contract proposal having a proposal price determined from the labor rate entered after review of the displayed minimum labor rate; and
   wherein the minimum labor rate calculation includes as factors, the equity investment in the business (EI) and a desired rate of return on the equity investment (ROE).

10. The system of claim 9 wherein said output device generates a revised contract proposal having a revised proposal price determined after review of the displayed maximum job discount.

11. The system of claim 9 wherein multiple sets of job parameter information is entered with said input device and wherein said program calculates a maximum job discount from all of the job parameter sets as a whole.

12. The system of claim 9 wherein the minimum labor rate calculation also includes the parameters:
average direct labor wages (AW), annual direct labor hours (DLH), workmen's compensation insurance rate (WCIR) and estimated overhead expenses (OE).

13. The system of claim 12 wherein the minimum labor rate (MLR) is calculated according to the formula:

$$MLR = AW + (AW * WCIR) + \frac{OE}{DLH} + \frac{(EI * ROE)}{DLH}.$$

14. The system of claim 9 including a memory and wherein said output device generates a survey and wherein said input device is used to enter survey results for storage in said memory.

15. The system of claim 14 wherein said output device generates reference lists from the survey results for attachment to proposals.

16. The system of claim 14 wherein said output device generates a report comparing survey results on a crew by crew basis.

17. A service business management system comprising:
a microprocessor;
memory for storing a contract price, and a minimum labor rate calculated by said microprocessor;
a program executing on said microprocessor for calculating an actual labor rate from the contract price and the actual labor hours;
an output device for generating a management report permitting evaluation of performance; and
wherein the minimum labor rate calculation includes as factors, the equity investment in the business (EI) and a desired rate of return on the equity investment (ROE).

18. The system of claim 17 wherein said output device generates a report comparing minimum labor rate to actual labor rate.

19. The system of claim 17 wherein said output device generates a report comparing actual labor rate to a contract labor rate calculated from the contract price and estimated labor hours entered with said input device.

20. The system of claim 17 wherein said output device generates a customer survey and wherein said input device is used to enter survey results for storage in said memory.

21. The system of claim 20 wherein output device generates reference lists from the survey results for attachment to proposals.

22. The system of claim 20 wherein said output device generates a report comparing survey results on a crew by crew basis.

* * * * *